(12) United States Patent
Lord

(10) Patent No.: US 7,359,184 B2
(45) Date of Patent: Apr. 15, 2008

(54) NOTEBOOK COMPUTER PROTECTION DEVICE

(75) Inventor: Charles Lord, Scottsdale, AZ (US)

(73) Assignee: Hotwire Development LLC, Scottsdale, AZ (US)

( * ) Notice: Subject to any disclaimer, the term of this patent is extended or adjusted under 35 U.S.C. 154(b) by 867 days.

(21) Appl. No.: 10/700,316

(22) Filed: Oct. 31, 2003

(65) Prior Publication Data

US 2004/0112776 A1 Jun. 17, 2004

Related U.S. Application Data

(60) Provisional application No. 60/422,587, filed on Oct. 31, 2002.

(51) Int. Cl.
*G06F 1/16* (2006.01)
(52) U.S. Cl. .................. 361/683; 361/679; 206/320
(58) Field of Classification Search ................ 361/683; D14/432, 439, 440; 206/586
See application file for complete search history.

(56) References Cited

U.S. PATENT DOCUMENTS

| | | | | |
|---|---|---|---|---|
| 5,160,001 A | * | 11/1992 | Marceau | 190/102 |
| D358,935 S | * | 6/1995 | Chang et al. | D14/289 |
| 5,570,780 A | * | 11/1996 | Miller | 206/305 |
| 6,208,504 B1 | * | 3/2001 | Cho et al. | 361/683 |
| 6,616,111 B1 | * | 9/2003 | White | 248/309.1 |
| 6,781,825 B2 | * | 8/2004 | Shih et al. | 361/683 |
| 6,896,134 B2 | * | 5/2005 | Russell et al. | 206/320 |
| 7,075,433 B2 | * | 7/2006 | Singer | 340/568.1 |
| 7,191,926 B1 | * | 3/2007 | Costantino et al. | 224/605 |
| 2003/0184958 A1 | * | 10/2003 | Kao | 361/683 |
| 2004/0022021 A1 | * | 2/2004 | Bovino | 361/683 |
| 2004/0025993 A1 | * | 2/2004 | Russell | 150/154 |
| 2005/0139498 A1 | * | 6/2005 | Goros | 206/320 |

* cited by examiner

*Primary Examiner*—Jayprakash Gandhi
*Assistant Examiner*—Anthony Q Edwards
(74) *Attorney, Agent, or Firm*—Jackson Walker LLP; Robert C. Klinger

(57) ABSTRACT

A notebook computer protection device forming a protective sleeve adapted to securely receive a notebook computer. The protection device is formed of a semi-rigid translucent material having a plurality of access openings permitting both a physical and visual inspection of the notebook computer lateral portions when secured therewithin. The protection device protects the notebook computer when subject to the examination process at airports and other transportation hubs, particularly when subject to the x-ray process at security checkpoints. The notebook computer protection device is light weight, inexpensive, and effectively protects a notebook computer during the inspection process, without requiring the removal of the notebook computer therefrom during the inspection process.

16 Claims, 5 Drawing Sheets

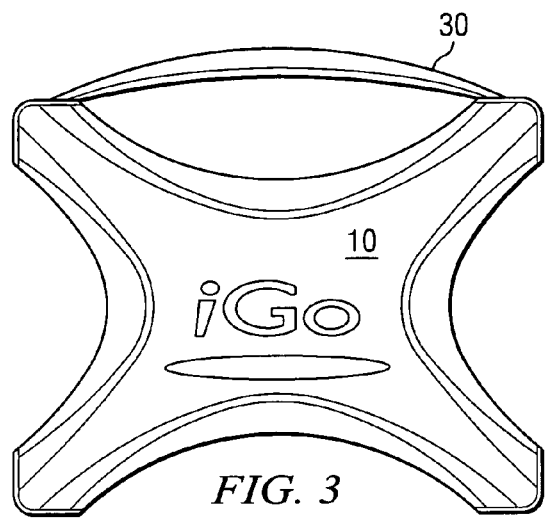
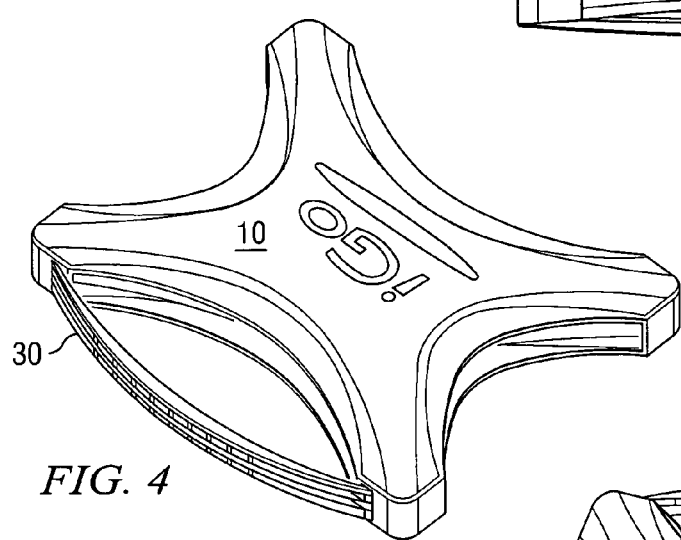
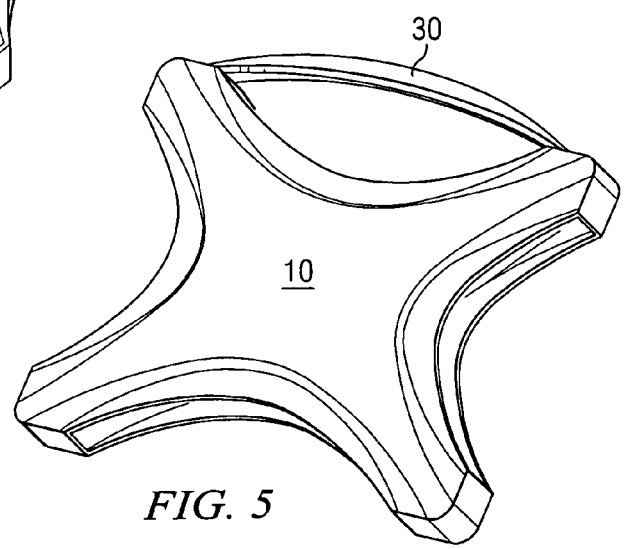
FIG. 7
FIG. 3
FIG. 6
FIG. 4
FIG. 5

NOTEBOOK COMPUTER PROTECTION DEVICE

CLAIM OF PRIORITY

This application claims priority of U.S. Provisional Patent Application Ser. No. 60/422,587 entitled "The Guardian" filed Oct. 31, 2002, the teaching of which are included herein by reference

FIELD OF THE INVENTION

The present invention is generally related to the field of notebook computers and computer accessories therefore, and more particularly to notebook computer protection devices.

BACKGROUND OF THE INVENTION

With the heightened security levels both in the United States and abroad, travelers with notebook computers are subject to even more intense screening of their notebooks through security at airports, as well as other transportation terminals. Currently, notebook computer owners are required to remove their notebook computer from its carrying case, and the notebook computers are required to be placed separately on a conveyor belt, or, in a tray as it is advanced through the screening process.

These notebook computers, while be designed to be rugged and portable, are subject to intense handling and jostling during the examination and x-ray process. Moreover, the ultimate drop off of the notebook computer down the stainless steel ramp at end of examination leads to damage and scratches of an expensive piece of equipment.

There is desired a notebook computer accessory suitable to facilitate handling and examination of a notebook computer outside of a notebook carrying case, yet which accessory provides physical access and visual inspection of a notebook computer as it is advanced through a security checkpoint. Such a device needs to facilitate easy access to the notebook computer, such as for use or for further inspection when required, yet which securely protects the notebook computer when subject to an examination process, and may even which may be suitable for carrying in a normal computer bag.

SUMMARY OF THE INVENTION

The present invention achieves technical advantages as a notebook computer protection device formed of a semi-rigid body member having a sleeve adapted to both receive and secure the notebook computer therewithin. The body member also has at least one opening permitting access to a lateral portion of the received notebook while secured therein, including physical access and visual access thereto.

In one preferred embodiment of the present invention, the reinforced body has a plurality of openings permitting access to a plurality of lateral portions of the notebook computer while secured therewithin. The body member is generally shaped like a "X", having a plurality of extensions defining the openings therebetween. The body member further includes a port adapted to receive the notebook computer into the sleeve, and also to permit the retrieval therefrom when required. The body member further comprises a retractable handle disposed across the port. The handle is adapted to permit manipulation of the body member when the notebook computer is received therewithin. Preferably, this handle is pivotably retractable and is bowed outwardly therefrom to provide accessibility.

The body member may further include a security device adapted to provide an alert when a notebook computer is removed from the body member. Preferably, the body member is comprised of a translucent material permitting a visual inspection of substantially all of the notebook computer when received therewithin. Preferably, the body member comprises a resilient member disposed within the sleeve adapted to securely cushion the notebook computer at its corners when received therewithin.

The notebook computer protection device, in combination with the notebook computer, provides a notebook computer owner a solution which permits security checkpoints to quickly and conveniently inspect the notebook computer as needed, yet which also protects the notebook computer during this process. This body member is adapted to secure the notebook computer therewithin, when stored in a carrying case if desired.

BRIEF DESCRIPTION OF THE DRAWINGS

FIGS. 2-7 are various views of the notebook computer protection device without the notebook computer;

DETAILED DESCRIPTION OF THE PREFERRED EMBODIMENT

Figure 1:
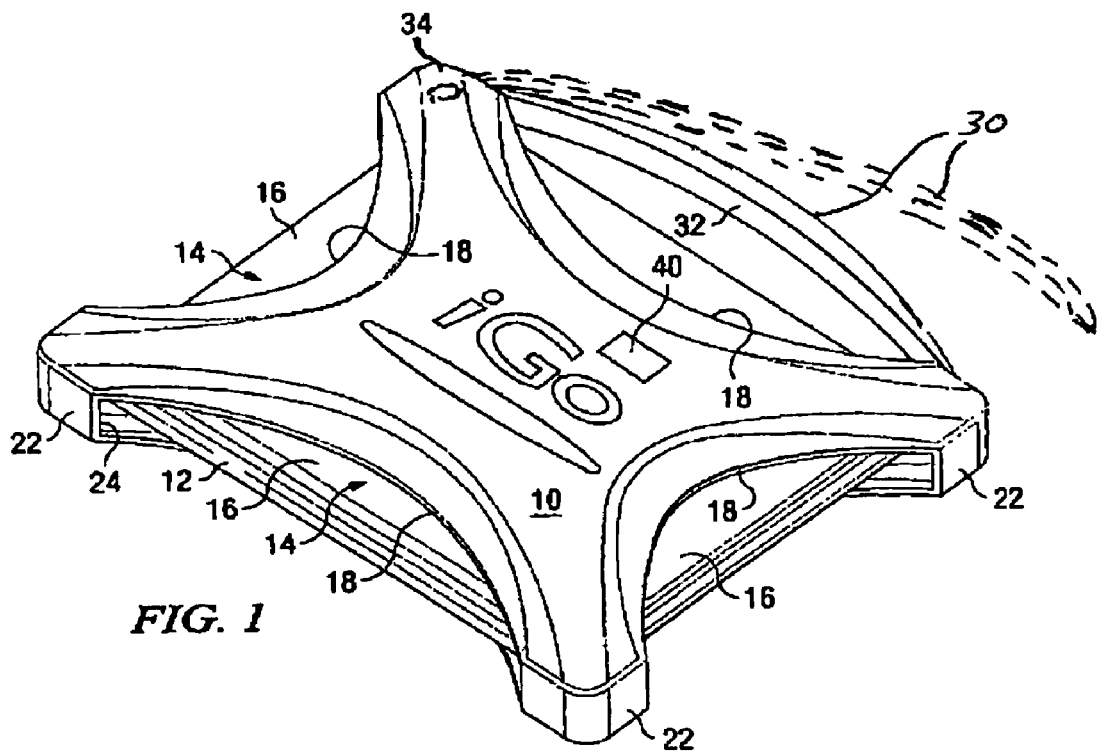
FIG. 1 is a perspective view of a first preferred embodiment of the invention securely receiving a notebook computer therewithin.

Referring now to FIG. 1, there is generally shown at 10 a notebook computer protection device 10 seen to securely receive therein a notebook computer 12. Body member 10 is reinforced and preferably comprised of a semi-rigid material, such as an elastomer or plastic, but may also be formed of a rigid material if desired. Body member 10 is seen to have a plurality of openings 14 permitting both physical and visual access to lateral portions 16 the notebook computer 12 when securely received therewithin. Openings 14 in the preferred embodiment are formed by a plurality of corresponding concave edges 18 extending between opposing body extensions 20. The concave edges 18 are further seen to be tapered downwardly and outwardly from a central portion of the body member 10 to reduce the weight of the body member 10, and also to provide an ecstatically pleasant appearance.

The opposing extensions 20 are also seen to be narrowed proximate their distal ends 22. Securely coupled to and between the opposing distal ends 22 of each extension 20 are seen to be an integral resilient receptacles 24 adapted to securely receive and grip the respective corner of the notebook computer 12, as shown. These receptacles 24 are preferably comprised of an elastomeric material, but also could be formed of, or have received therewithin, a resilient material such as a foam-like material.

Disposed across one opening of body member 12 is seen to be a pivotable retractable handle 30 which bows outwardly, and has a midsection gripping surface 32. Handle 30 is adapted to pivot about a pivot pin 34 extending vertically between the two respective opposing extensions 22, as shown. At the other end of handle 30 is a locking mechanism adapted to selectively and securely lock the handle 30 in a closed position to the proximate extensions 22, as shown. Device 10 further may include a security device, such as a security alarm, responsive to the removal of the notebook computer from device 10. One configuration of the security device 40 may include a proximity sensor that may be armed/disarmed by an IR programming device, by the entering of a passcode, or other suitable activation device as desired.

Figure 2:
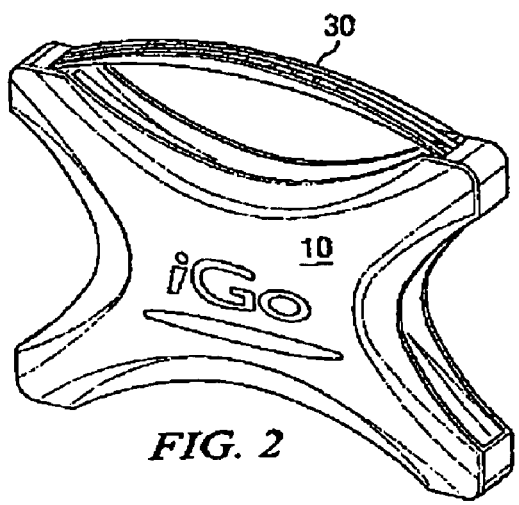

FIGS. 2-7 show various views of the notebook computer protection device 10 shown in FIG. 1, without the notebook computer 12 received therein. As shown, the device 10 is suited to stand vertically on its own as shown in FIG. 2, and has elastic handle 30 extending thereacross to form a carrying handle.

Figure 8:
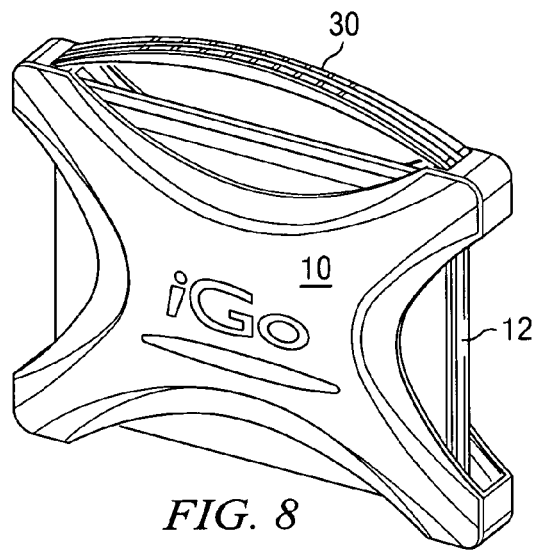
FIGS. 8-13 are various views of the notebook computer protection device securely receiving the notebook computer.
Figure 9:
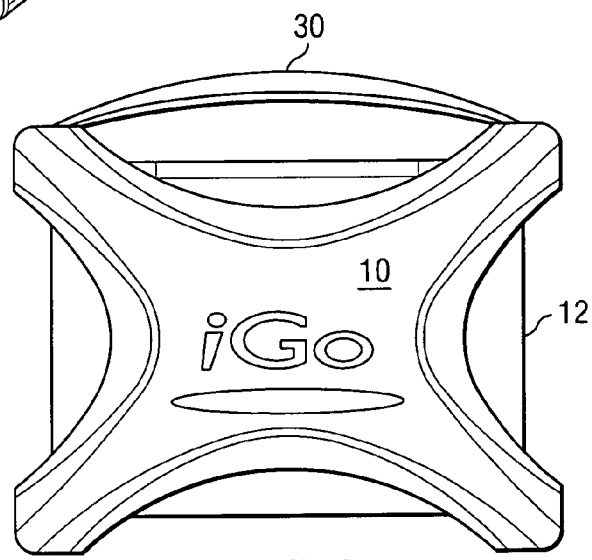
Figure 10:
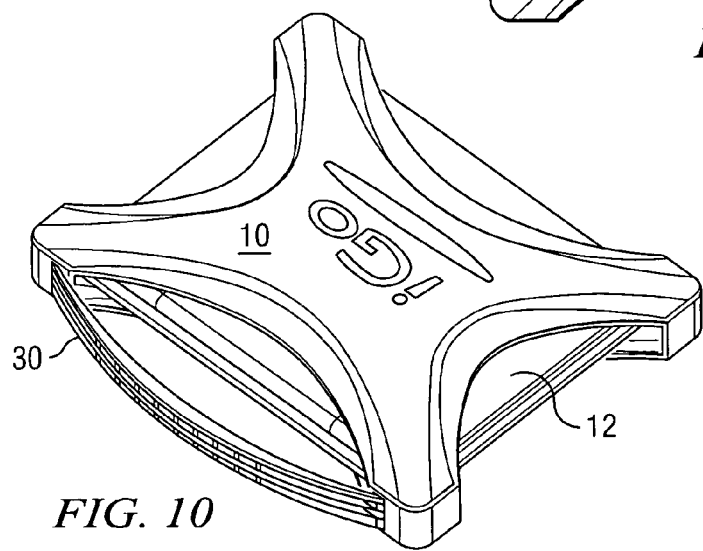
Figure 11:
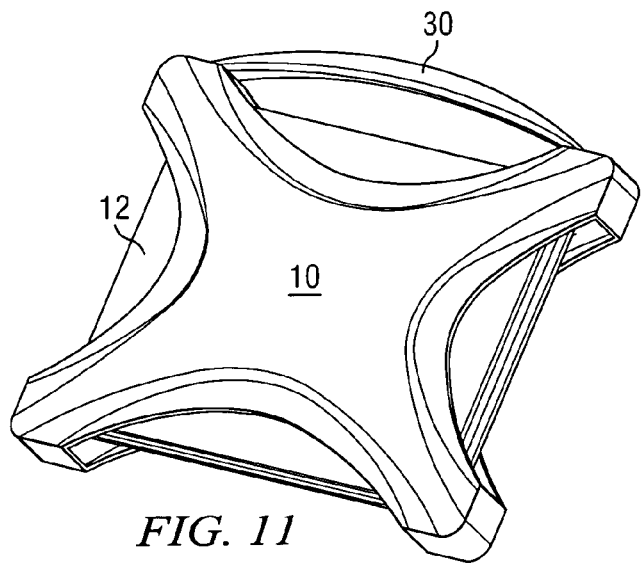
Figure 13:
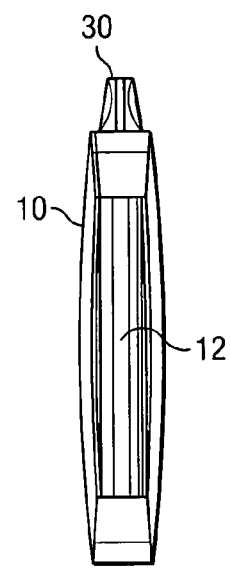
Figure 12:
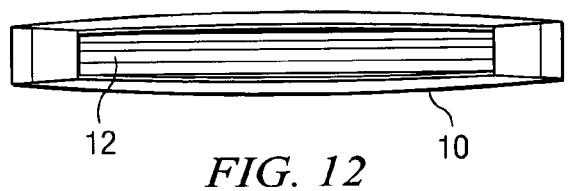

FIGS. 8-13 show various views of the notebook computer protection device 10 with the notebook computer 12 received therewithin. As shown in FIG. 8, device 10 receiving notebook computer 12 also is adapted to stand freely in an vertical orientation due to the bottom flat surfaces of the respective extensions 20.

Figure 14:
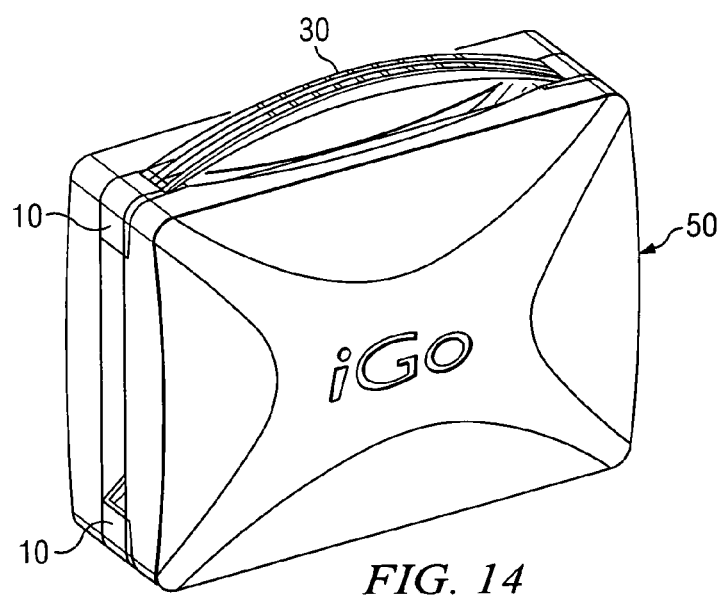
FIG. 14 shows a saddle bag secured about the notebook computer and protection device.

Referring now to FIG. 14, there is shown a second embodiment of the present invention seen to include a saddle bag 50 securely receiving the protection device 10 and notebook computer 12 therewithin.

Figure 15:
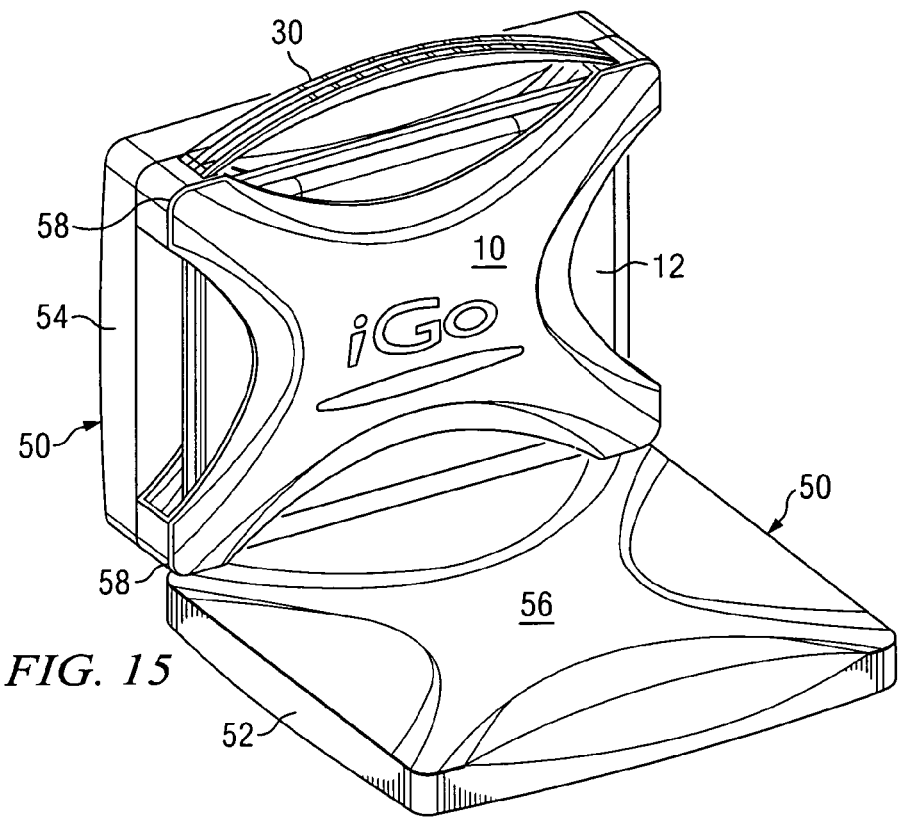
FIG. 15 shows one side of the saddle bag being removed.

As shown in FIG. 15, the saddle bag 50 is seen to have two halves 52 and 54, each having an inner surface 56 having recesses which conform to the outer surface of device 10, as shown. Each of saddle bag halves 52 and 54 are adapted to secure to the respective corners of device 10 through a locking arrangement 58, such as a tongue and groove locking mechanism, snaps, Velcro mechanism, or other suitable locking mechanism. In yet another alternative preferred embodiment these respective halves 52 may be adapted to secure to each other, about device 10 and computer 12, without the attachment to device 10.

Figure 16:
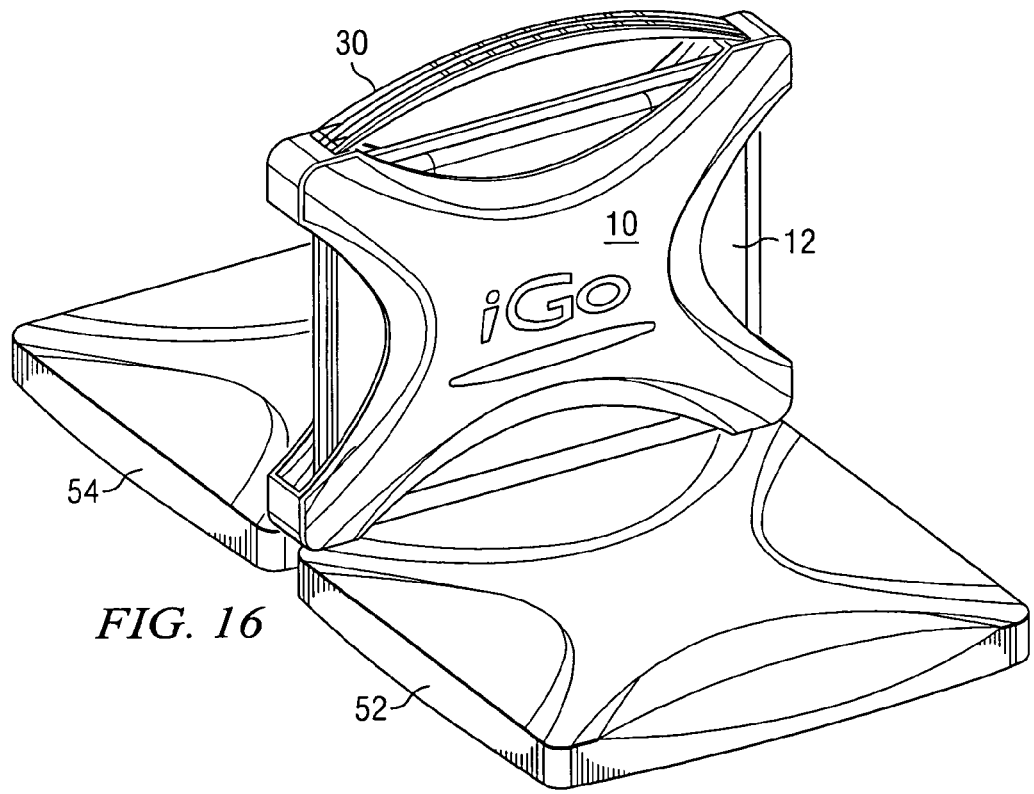
FIG. 16 shows both sides of the saddle bag removed, fully exposing the notebook computer secured within the protection device.

FIG. 16 shows the saddle bag 50 fully removed from device 10 and notebook computer 12 providing complete access to device 10 and notebook 12, as shown.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A notebook computer protection device, comprising: a reinforced body member having a sleeve adapted to secure a notebook computer therewithin, the body member having at least one opening permitting access to a lateral portion of the received notebook computer while secured therewithin without manipulating the body member wherein the body member has a plurality of openings permitting access to a plurality of lateral portions of the notebook computer while secured therewithin, and wherein the body member has a plurality of extensions defining the openings therebetween.

2. The notebook computer protection device as specified in claim 1 wherein the body member has a port coupled to the sleeve and is adapted to receive the notebook computer and also to permit retrieval therethrough.

3. The notebook computer protection device as specified in claim 2 further comprising a retractable handle disposed across the port and adapted to permit manipulation of the body member when the notebook computer is received therein.

4. The notebook computer protection device as specified in claim 3 wherein the handle is pivotably retractable.

5. The notebook computer protection device as specified in claim 3 wherein the handle curves outwardly from the body member.

6. The notebook computer protection device as specified in claim 1 wherein the body member further includes a security device adapted to provide an alert when the notebook computer is removed from the body member.

7. The notebook computer protection device as specified in claim 1 wherein the body member is comprised of a translucent material permitting a visual inspection of substantially all of the notebook computer when received therewithin.

8. The notebook computer protection device as specified in claim 1 wherein the body member further comprises a resilient member disposed proximate the sleeve and adapted to securely cushion the notebook computer when received therewithin.

9. In combination:
a notebook computer; and
a reinforced body member having a sleeve adapted to both receive and secure a notebook computer therewithin, the body member having at least one opening permitting access to a lateral portion of the received notebook computer while secured therewithin without manipulating the body member wherein the body member has a plurality of openings permitting access to a plurality of lateral portions of the notebook computer while secured therewithin, and wherein the body member has a plurality of extensions defining the openings therebetween.

10. The combination as specified in claim 9 wherein the body member has a port coupled to the sleeve and is adapted to receive the notebook computer and also to permit retrieval therethrough.

11. The combination as specified in claim 10 further comprising a retractable handle disposed across the port and adapted to permit manipulation of the body member when the notebook computer is received therein.

12. The combination as specified in claim 11 wherein the handle is pivotably retractable.

13. The combination as specified in claim 11 wherein the handle curves outwardly from the body member.

14. The combination as specified in claim 9 wherein the body member further includes a security device adapted to provide an alert when the notebook computer is removed from the body member.

15. The combination as specified in claim 9 wherein the body member is comprised of a translucent material permitting a visual inspection of substantially all of the notebook computer when received therewithin.

16. The combination as specified in claim 9 wherein the body member further comprises a resilient member disposed proximate the sleeve and adapted to securely cushion the notebook computer when received therewithin.

* * * * *